Patented Jan. 2, 1951

2,536,984

UNITED STATES PATENT OFFICE 2,536,984

AMINOMETHYL COMPOUNDS OF THE BENZ-ANTHRONE SERIES AND THE N-PHTHAL-OYL DERIVATIVES THEREOF

David I. Randall and Saul R. Buc, Easton, Pa., assignors to General Aniline & Film Corporation, New York, N. Y., a corporation of Delaware No Drawing. Application November 16, 1948, Serial No. 60,396

5 Claims. (Cl. 260—326)

This invention relates to phthalimidomethyl derivatives of the benzanthrone and dibenzanthronyl series, the corresponding phthalamic acids and aminomethyl derivatives, and to a method of preparing the same.

It is known that polycyclic ketones and quinones react with formaldehyde in 96% sulfuric acid to yield condensation products which are not uniform in structure and dyeing properties.

We have found that benzanthrones and dibenzanthronyls in which at least one of the 3- and 9-positions is unoccupied, i. e., free of a substituent group, react in the presence of concentrated sulfuric acid with N-hydroxymethylphthalimides to yield 3-phthalimidomethyl and 3,9-diphthalimidomethyl benzanthrones and dibenzanthronyls. These compounds are not only valuable as dyestuff intermediates, colorants and pigments, but on base splitting to the phthalamic acid yield dyestuff intermediates which are also valuable as colorants in dyeing nylon, wool, and as pigments in ink bases.

It is an object of the present invention to provide 3-phthalimidomethyl and 3,9-diphthalimidomethyl dyestuff intermediates of the benzanthrone and dibenzanthronyl series.

A further object is to provide aminomethyl and phthalamic acid derivatives from said dyestuff intermediates by hydrolysis.

A still further object is to provide a process of preparing said dyestuff intermediates and the hydrolysis products thereof.

Other objects and advantages will become apparent from the following description.

The above and other objects are accomplished by condensing a benzanthrone or dibenzanthronyl in which at least one of the 3- and 9-positions is unoccupied with an N-hydroxymethylphthalimide in the presence of concentrated sulfuric acid.

The group or groups present in the benzanthrone or dibenzanthronyl ring system is immaterial so long as at least one of the 3- or 9-positions is unoccupied and so long as the positions ortho to the 3- or 9-positions is not occupied by a meta-directing substituent group, e. g., nitro, carboxy, sulfo, etc. When both the 3- and 9-positions are unoccupied, it is possible, during the condensation reaction to introduce two phthalimidomethyl groups into such unsubstituted positions of the benzanthrone ring and dibenzanthronyl ring.

In practicing the invention a gram mol of a benzanthrone or dibenzanthronyl in which at least one of the 3- or 9-positions is unoccupied is dissolved in 96% sulfuric acid at a temperature ranging from 10° C. to 80° C. and to the solution is added 1 to 2 molecular equivalents (in 6% molar excess) of an N-hydroxymethylphthalimide. The mixture is allowed to stand, preferably with stirring, for a period of time ranging from several hours to several days at a temperature between 20–40° C. to 145° C. When 1 mol of the benzanthrone or dibenzanthronyl is treated with 1 mol of N-hydroxymethylphthalimide (in 6% molar excess), the condensation reaction is allowed to stand, preferably with stirring, for a period of time ranging from 12 to 20 hours at a temperature between 25–40° C., preferably at a temperature ranging between 25–30° C. When 2 mols of N-hydroxymethylphthalimide are treated with 1 mol of a 3,9-unsubstituted benzanthrone to form the diphthalimidomethyl benzanthrone, the condensation reaction is carried out by allowing the mixture to stand preferably with stirring for a period of time ranging from 2 to 5 hours at a temperature between 75–85° C. After the condensation reaction is complete, the reaction mixture is then poured over ice, the precipitate filtered off, washed several times with water and dried. The precipitated product may be used as such as a dyestuff intermediate or subjected to hydrolysis as hereinafter described to yield phthalamic acid and aminomethyl benzanthrones and dibenzanthronyls.

The molecular equivalents of the N-hydroxymethyl-phthalimide to be employed will depend upon the number of the phthalimidomethyl groups to be introduced into the 3 and 9 positions of the benzanthrone or dibenzanthronyl ring. For each unoccupied position in either 3 or 9 or both positions of the benzanthrone or dibenzanthronyl ring, the maximum number of molecular equivalents (in 6% molar excess) of an N-hydroxymethylphthalimide to be employed corresponds to the sum of the available reactive positions. Thus, when only one of the 3 or 9 positions is unsubstituted, 1 molecular equivalent (in 6% molar excess) is employed. When two positions, i. e., 3 and 9 are unsubstituted, 2 molecular equivalents (in 6% molar excess) are employed for each of the unsubstituted positions. It is, therefore, possible to direct not only 1 but 2 phthalimidomethyl groups into each one of the unsubstituted 3 and 9 positions of the benzanthrone and dibenzanthronyl ring.

The benzanthrones and dibenzanthronyls in which at least one or both of the 3 and 9 positions are unoccupied may be substituted in any one of the other positions by an ortho-para-directing substituent, such as a halogen, e. g., chlorine or bromine, an alkyl, e. g., methyl, ethyl, propyl, etc., acrylic acid or thioglycollic acid group and the like. Such groups may appear in one or more or all of the positions other than 3 and/or 9 position. Meta-directing substituent groups such as aldehyde, nitro, carboxyl, or sulfonic acid group can occupy any position in the benzanthrone or benzanthronyl nucleus provided at least one of the 3 and 9 positions remains unoccupied and said substituent does not occupy a position ortho to one of said unoccupied positions.

As representative of benzanthrones and dibenzanthronyls in which at least one of the 3 and/or 9 positions is unoccupied and falling within the foregoing description, reference may be made to the following:

3-benzanthronyl-thioglycollic acid
4-propyl benzanthrone
2-benzanthrone aldehyde
2-benzanthrone acrylic acid
9-chlorbenzanthrone
9-methylbenzanthrone
2-methylbenzanthrone
3-brombenzanthrone
4,4'-bis-7-benz[de]anthracen-7-one
2,2'-dimethyl-4,4'-dibenzanthronyl
2,2'-diethyl-4,4'-dibenzanthronyl
2,2'-dimethoxy-4,4'-dibenzanthronyl
2,2-dihydroxy-4,4'-dibenzanthronyl.

The N-hydroxymethylphthalimides which may be employed are N-hydroxymethylphthalimide itself, a substituted N-hydroxymethylphthalimide wherein one or more substituents may be present in the 3 to 6 positions of the benzene nucleus. Thus, there are included such representative N-hydroxymethylphthalimides as:

N-hydroxymethyl-3-methylphthalimide
N-hydroxymethyl-4-methylphthalimide
N-hydroxymethyl-4,5-dibromophthalimide
N-hydroxymethyl-4-chlorophthalimide
N-hydroxymethyl-3,4-dichlorophthalimide
N-hydroxymethyl-3-nitrophthalimide
N-hydroxymethyl-4-nitrophthalimide
N-hydroxymethyl-5-aminophthalimide
N-hydroxymethyl-6-aminophthalimide The N-hydroxymethylphthalimides are readily prepared by boiling formalin solution with a phthalimide.

Instead of employing an N-hydroxymethylphthalimide in the condensation reaction, molecular equivalents of a phthalimide and formaldehyde or a formaldehyde producing compound, such as paraformaldehyde may be used.

Our invention will be more fully described in conjunction with the following specific examples. It should be understood, however, that the examples are given by way of illustration only and the invention is not to be limited by the details set forth herein.

*Example I*

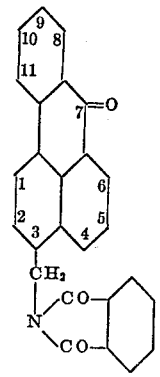

23 grams of benzanthrone were dissolved in 140 cc. of 96% sulfuric acid. When solution was completed, 18.7 grams of N-hydroxymethylphthalimide were stirred in (the temperature rose from 31° C. to 37° C.), and the solution allowed to stand for 15 hours. The condensation product was worked up by pouring into ice water, filtering and washing the filtrate free of acid, and drying at 80° C. The dried light-yellow product weighed 39 grams or 100% of theory and melted at a temperature ranging between 245–270° C. After crystallizing twice from o-dichlorobenzene, the melting point was raised to 294–297° C. without decomposition.

The nitrogen analysis showed the following results:

N calculated _____ 3.61
N found _____ 3.71

Caustic fusion in alcohol failed to give a violanthrone dye which is characteristic of benzanthrones with free 3 and 4 positions. From this caustic fusion, it is evident that the 3 position is occupied by the phthalimidomethyl group.

*Example II*

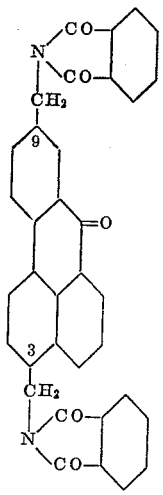

38.9 grams of the condensation product of Example I and 18.7 grams of N-hydroxymethylphthalimide were dissolved in 210 cc. of 96% sulfuric acid and the solution stirred for 2 hours at 80° C. The reaction mixture was worked up as in Example I and 53 grams of a pale yellow solid (97% of theory) were isolated.

The following example illustrates the alkaline hydrolysis of the 3-phthalimidomethyl- and 3,9-diphthalimidomethyl - benzanthrones and dibenzanthronyls to the corresponding phthalamic acid alkali metal salt and the conversion thereof to the free acid.

Example III

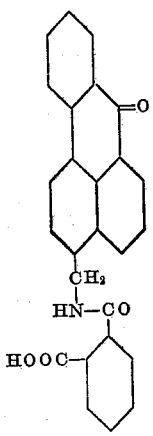

Hydrolysis to the phthalamic acid was readily brought about by refluxing 19.5 grams of the condensation product of Example I in 300 cc. of ethanol containing 11 grams of dissolved potassium hydroxide for 5 minutes. This solution was poured into 1.5 liters of hot water, then heated to 100° C. and filtered. The filtrate was acidified with hydrochloric acid and the resulting yellow flocculent precipitate filtered off. The weight of the phthalamic acid was 15 grams.

The following example illustrates the acid hydrolysis of the 3-phthalimidomethyl- and 3,9-diphthalimidomethyl - benzanthrones and dibenzanthronyls to the corresponding aminomethyl benzanthrone and dibenzanthronyls.

Example IV

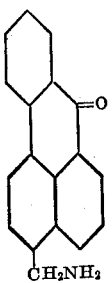

29.2 grams of the purified condensation product of Example I having a melting point of 295° C. were dissolved in 150 cc. of 96% sulfuric acid. The acid strength was diluted to 80% by the addition of 55 cc. of water. The solution was held at a temperature of 140-145° C. for 2 hours. During this heating period, the sublimation of a considerable quantity of phthalic anhydride was noted. After cooling to 50° C. the orange solution was poured into 2 liters of cold water. The sulfate of the amine was isolated by chilling to 7° C. and filtering off the voluminous yellow product precipitated. Crystallization began at about 30° C. After dissolving 3-aminomethyl benzanthrone sulfate in 1 liter of hot water, the free amine was precipitated as an oil by the addition of sodium hydroxide. The amine first appeared as an oil but on cooling to room temperature it congealed. The material was filtered off and dried in a vacuum oven at 40° C. The weight was 12 grams or 74% of theory. It had the properties expected of a benzylamine being a fairly strong base and very insoluble in alkali. On nylon and acetate, it gave strong yellow dyeings.

Example V

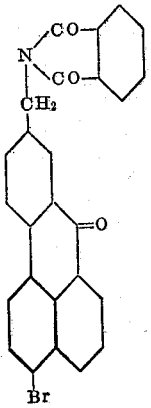

154.5 grams of 3-bromo-7-benz[de]anthracen-7-one (powdered) were dissolved in 875 cc. of 96% sulfuric acid. After solution was complete, 95.4 grams of hydroxymethylphthalimide were dissolved and the solution heated at 80° C. for 1 hour and stored overnight at 30° C. The solution was poured in 5.5 liters of water, stirred well, filtered, and dried. The weight of the product was 234 grams or 100% of theory. Recrystallization from dichlorobenzene raised the melting point from 268-291° C. to 291-293° C.

The nitrogen and bromine analyses showed the following results:

| | |
|---|---|
| N calculated | 2.99 |
| N found | 3.07 |
| Br calculated | 17.1 |
| Br found | 17.8 |

Example VI

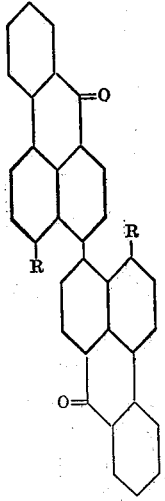

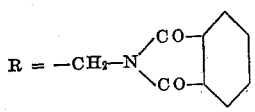

22.9 grams of 4,4'-bis-7-benz[de]anthracen-7-one were dissolved in 175 cc. of 96% sulfuric acid. To this solution 18.7 grams of hydroxymethylphthalimide were added and the reaction mixture held at 30° C. for 12 hours. On working up the reaction mixture as in Example I, 36 grams of an olive green material (95% of theory) were isolated.

The compounds of Examples V and VI were also hydrolyzed by the procedure of the foregoing examples to yield aminomethyl and phthalamic acid derivatives.

While we have disclosed the preferred embodiments of our invention and the preferred modes of carrying the same into effect, it will be readily apparent to those skilled in the art that many variations may be made therein without departing from the spirit thereof. Accordingly, the scope of our invention is to be limited solely by the following claims.

We claim:

1. A dyestuff intermediate selected from the class consisting of benzanthrone and dibenzanthronyl containing as the only nuclear substituents in both of the 3 and 9 positions of a benzanthrone ring a member selected from the class consisting of aminomethyl, phthalimidomethyl, and o-carboxybenbzoylaminomethyl groups.

2. A dibenzanthronyl dyestuff intermediate characterized by the following formula:

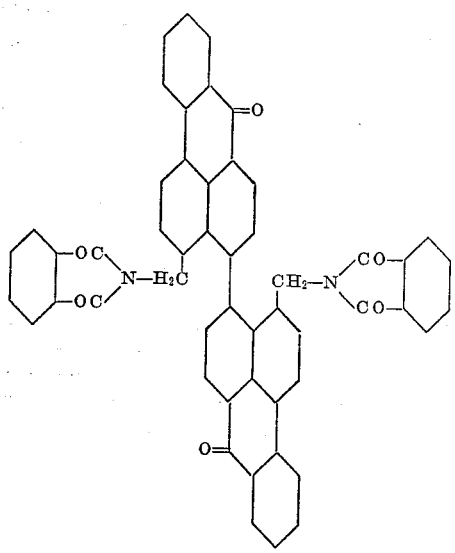

3. A benzanthrone dyestuff intermediate characterized by the following formula:

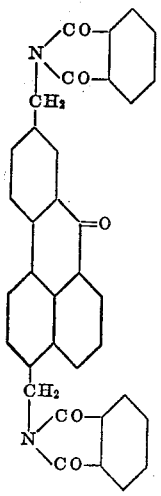

4. The process of preparing an N-phthaloyl-aminomethyl derivative selected from the class consisting of benzanthrone and 4,4'-dibenzanthronyl which comprises condensing in the presence of concentrated sulfuric acid 2 mols of an N-hydroxymethylphthalimide with 1 mol of a compound selected from the class consisting of benzanthrone and 4,4'-dibenzanthronyl said compound being free of hydroxyl groups and having both of the positions 3 and 9 in a benzanthrone nucleus thereof unsubstituted and having no meta-directing substituent in ortho position to the carbon atom in said 3 and 9 positions.

5. The process of preparing an N-phthaloyl-aminomethyl derivative of benzanthrone which comprises condensing in the presence of concentrated sulfuric acid 2 mols of N-hydroxymethylphthalimide with 1 mol of benzanthrone.

DAVID I. RANDALL.
SAUL R. BUC.

REFERENCES CITED

The following references are of record in the file of this patent:

UNITED STATES PATENTS

| Number | Name | Date |
|---|---|---|
| 1,946,829 | Bayer | Feb. 13, 1934 |

FOREIGN PATENTS

| Number | Country | Date |
|---|---|---|
| 127,927 | Switzerland | Sept. 17, 1928 |
| 507,049 | Germany | Sept. 15, 1930 |
| 141,211 | Switzerland | Sept. 16, 1930 |
| 511,951 | Germany | Nov. 3, 1930 |
| 753,976 | France | Aug. 21, 1933 |

OTHER REFERENCES

Beilstein (4th Edition), vol. 21, page 467.